(12) United States Patent
Alfallaj

(10) Patent No.: US 11,708,149 B2
(45) Date of Patent: Jul. 25, 2023

(54) AIRCRAFT SPARE LANDING GEAR

(71) Applicant: Ibrahim Alfallaj, Dammam (SA)

(72) Inventor: Ibrahim Alfallaj, Dammam (SA)

( * ) Notice: Subject to any disclaimer, the term of this patent is extended or adjusted under 35 U.S.C. 154(b) by 154 days.

(21) Appl. No.: 17/224,148

(22) Filed: Apr. 7, 2021

(65) Prior Publication Data
US 2021/0291965 A1 Sep. 23, 2021

Related U.S. Application Data

(63) Continuation-in-part of application No. PCT/SA2019/050017, filed on Sep. 24, 2019.

(51) Int. Cl.
*B64C 25/06* (2006.01)
*B64C 25/10* (2006.01)
*B64C 25/36* (2006.01)
*B64C 25/04* (2006.01)

(52) U.S. Cl.
CPC .............. *B64C 25/06* (2013.01); *B64C 25/10* (2013.01); *B64C 25/36* (2013.01); *B64C 25/04* (2013.01)

(58) Field of Classification Search
CPC ......... B64C 25/06; B64C 25/10; B64C 25/36; B64C 25/04; B64C 25/32
See application file for complete search history.

(56) References Cited

U.S. PATENT DOCUMENTS

| 4,799,630 | A | 1/1989 | Richards | |
|---|---|---|---|---|
| 6,651,928 | B1 * | 11/2003 | Stuhr | B64C 7/02 244/102 R |
| 11,427,310 | B2 * | 8/2022 | Barakatain | B64C 25/14 |
| 2016/0016658 | A1 | 1/2016 | Walitzki | |
| 2016/0046381 | A1 * | 2/2016 | Barmichev | B64D 27/02 244/54 |
| 2016/0221670 | A1 * | 8/2016 | Robinson | B64C 25/66 |
| 2017/0297682 | A1 * | 10/2017 | Grip | B64C 7/00 |
| 2018/0050791 | A1 * | 2/2018 | Robinson | B64C 25/54 |
| 2018/0162514 | A1 | 6/2018 | Bellet et al. | |

FOREIGN PATENT DOCUMENTS

WO 2016141447 A1 9/2016

OTHER PUBLICATIONS

ISR; European Patent Office; Netherlands, Nov. 15,2019.

* cited by examiner

*Primary Examiner* — Rodney A Bonnette
(74) *Attorney, Agent, or Firm* — Patshegen IP; Moshe Pinchas

(57) ABSTRACT

The present invention relates to the auxiliary spare landing equipment for the aircraft to be used in the events of emergency landings. Each spare landing set consists of relatively small sized wheels; these sets are located at the bottom of the Aircraft, specifically in the centers of gravity on which the aircraft rests on the ground. The wheels are fully covered and concealed by airfoil casings to ensure efficient airflow and maintain optimal ratios during flights. The uniqueness of the present invention is in the casing of the gear which is designed in a manner of shatters and scatters upon impact with the ground while landing, whenever malfunction on the main landing system. In case of such malfunction, the aircraft initiates the landing process, resulting in casings to break upon hitting the runway, while the spare wheels appear and carry the aircraft.

6 Claims, 11 Drawing Sheets

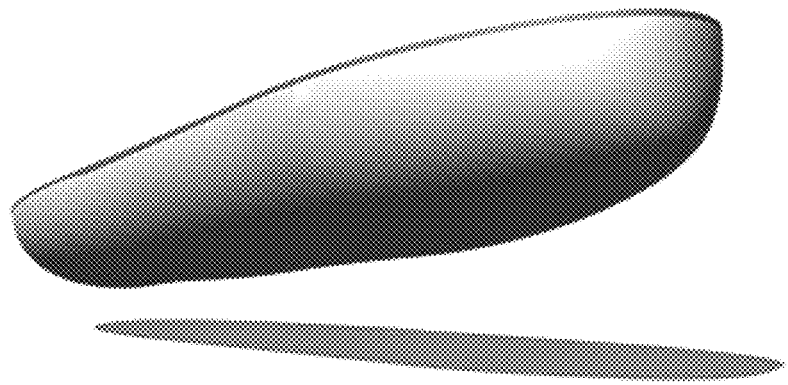
Figure (1 - A)
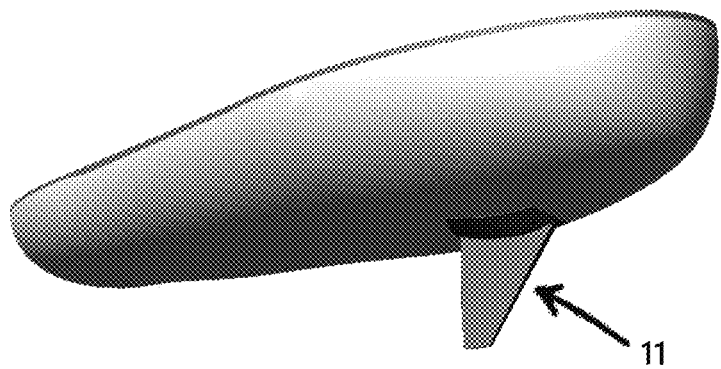
Figure (1 - B)

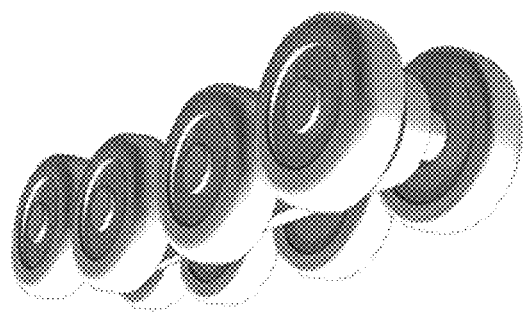
Figure (2)

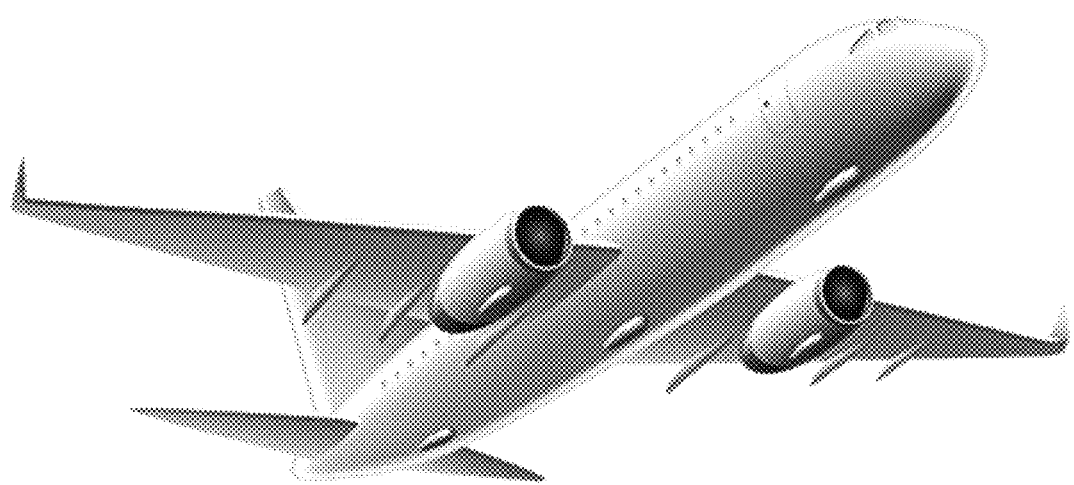
Figure (3 - A)

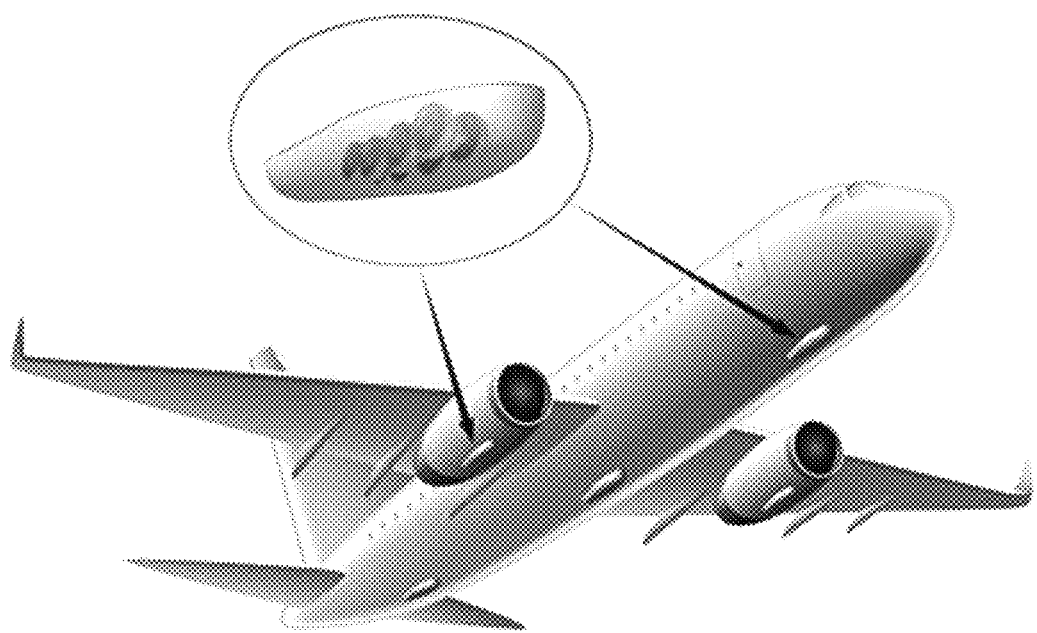
Figure (3 - B)

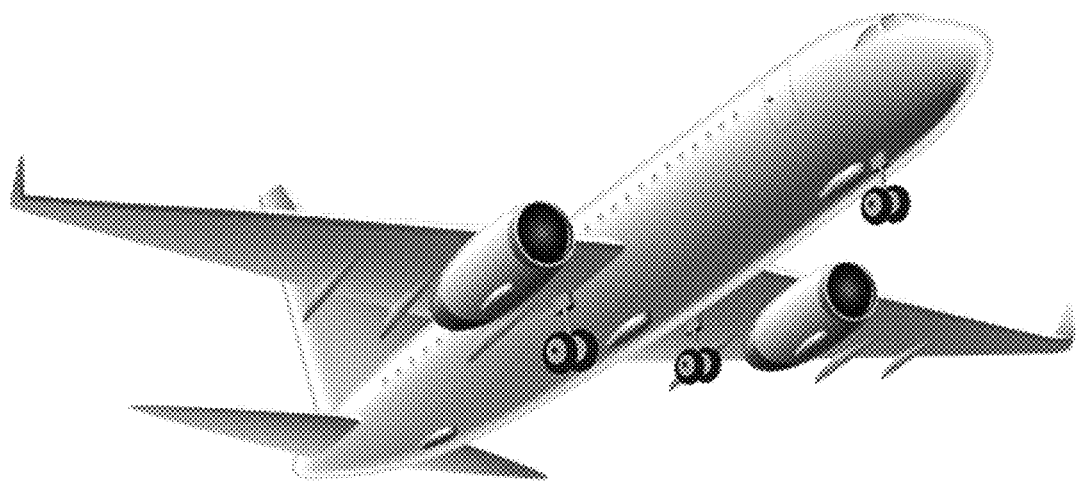
Figure (3 - C)

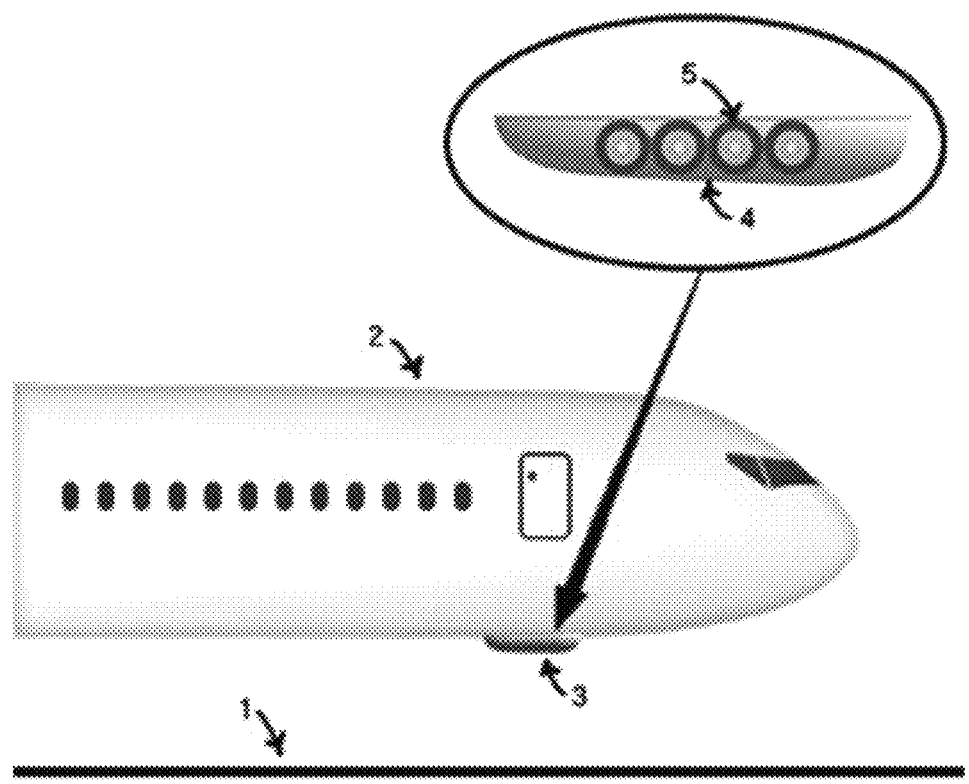
Figure (4 - A)

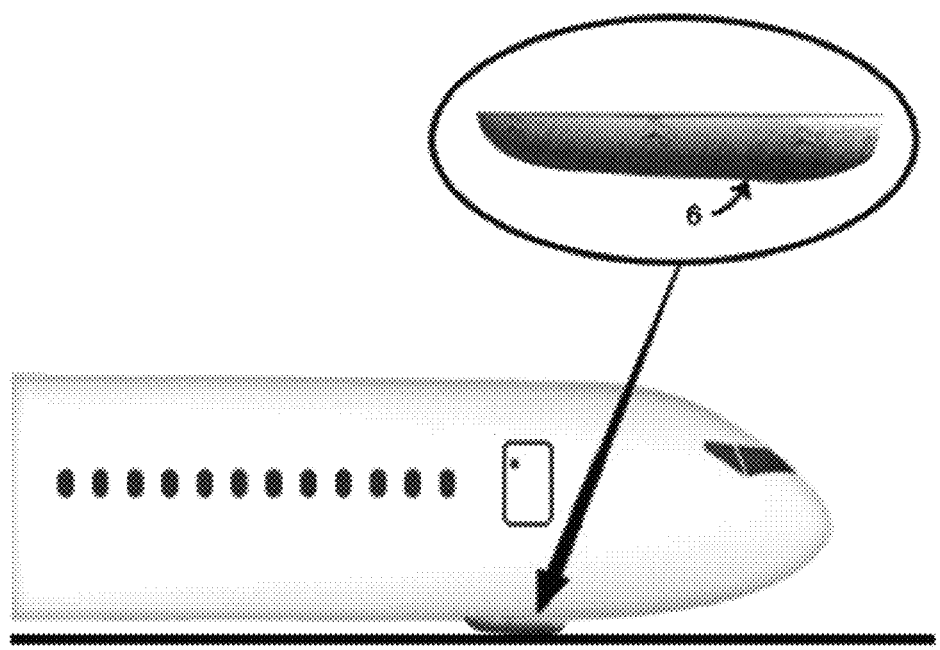
Figure (4 - B)

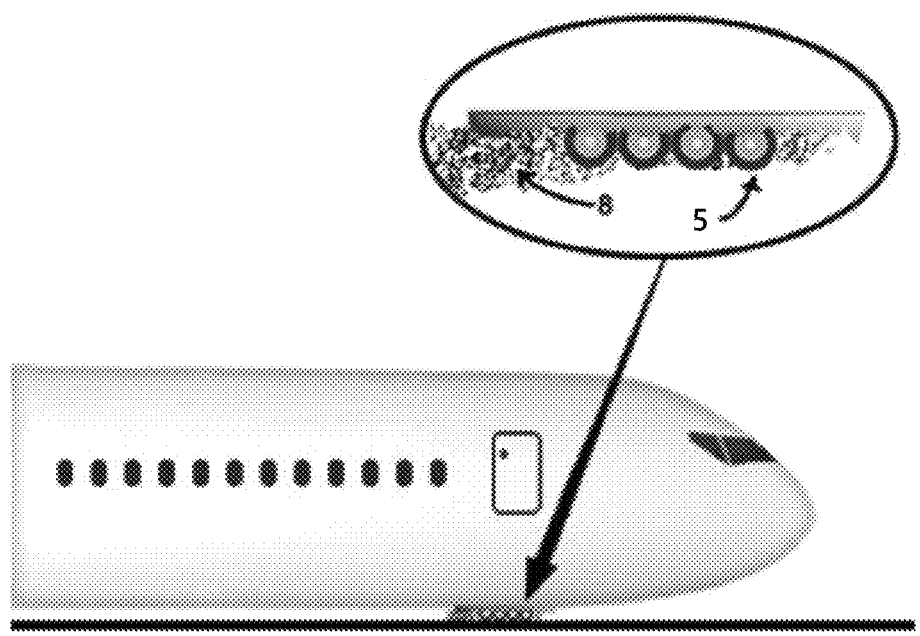
Figure (4 - C)
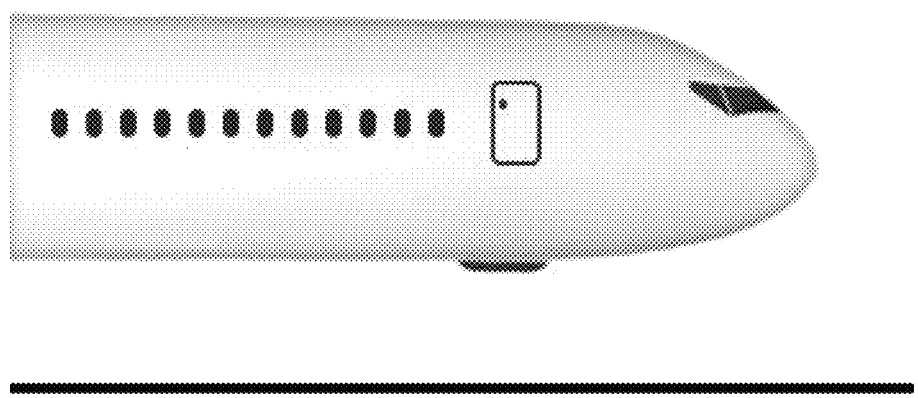
Figure (4 - D)

Figure (5 - A)

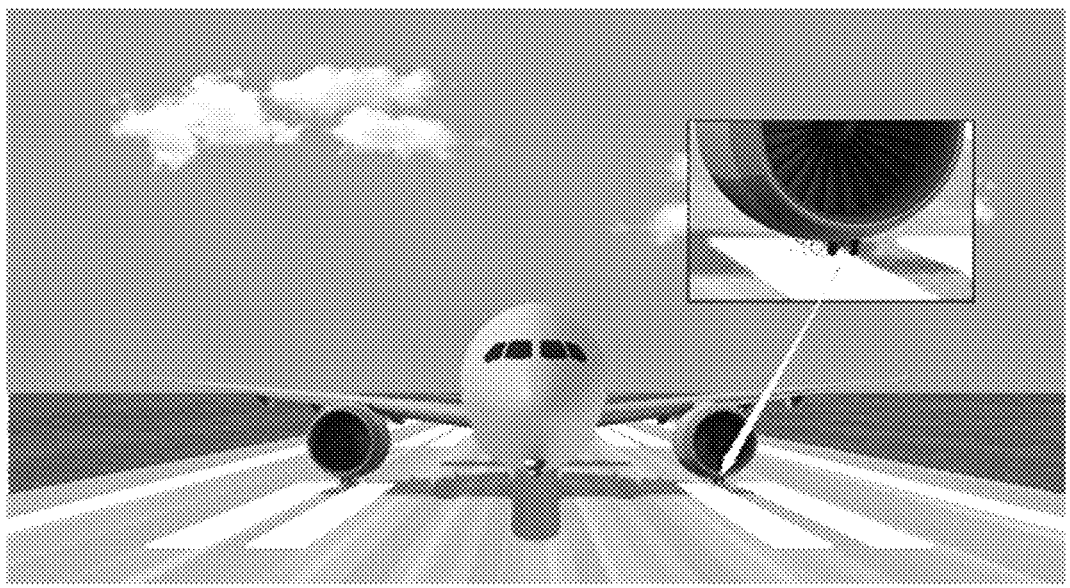
Figure (5 - B)

Figure (5 - C)

AIRCRAFT SPARE LANDING GEAR

THE BACKGROUND OF THE INVENTION

The present invention is related to the field of emergency landing of aircraft, where to date there are no appropriate solution to avoid damages caused by the forced landing of the aircraft when the basic landing systems fail to operate properly. There are various reasons for these systems malfunction, such as the loss of hydraulic system fluids, malfunctions in the arms and landing gear, or a malfunction in the electrical circuits, responsible for sending commands, are possible reasons cause in the failure of the landing systems. Among the possible reasons for the failure of the basic landing system is also the failure to open the doors and the hydraulic or oil shock absorbers, which in turn are responsible for moving the wheels in and out of their places within the airframe.

On the other hand, there are a set of international procedures currently followed in the event of aircraft emergency landing when a defect occurs that prevents the basic landing equipment from operating properly, and they are generally not very feasible procedures. Among these regulations are: Putting slippery foam on the runway or setting up a net to capture the aircraft, both of which are ineffective due to the risk of collision, crash, and fire, as well as not ensuring the stability of these aircraft in a specific path upon landing. In other cases, aircraft head to rivers and waterways for emergency landings, which leads to a very high probability of gruesome disasters.

Internationally, a few ideas have emerged as attempts to find solutions to the aircraft emergency landing when basic landing systems cannot operate, specifically ideas that suggest adding landing back-up attachments to aircraft. Through the stages of this research, several relevant patents that are related to this field have been viewed and studied, in which turns out that most of the attachment designs addressed to the landing gear revolves around the following:

U.S. Patent No. (US 2016/0016658 A1) registered (Hans J. Walitzki & Wing S. Luk) dated (Jan. 21, 2016) and entitled "Aircraft Auxiliary Drive Wheel Taxi System". This invention is a system consisting of a wheel mounted with a shock absorber in addition to a power generator and installed in specific places on the fuselage and its aim is to drive the aircraft and self-move it on the ground without the need for the main engine of the aircraft as well as without the need for specialized propulsion and towing equipment, thus saving fuel consumption and enables the aircraft to move independently on the landing ground.

It should be noted here that the possibility of using this invention as an alternative to the main landing system during landing on the runway has not been addressed. The purpose of this invention is to self-pilot the aircraft on the runway floor either before take-off or after the landing and not during the landing, whereas the purpose of the present invention is to ensure an aircraft landing safely during the emergency landing process.

U.S. Pat. No. 4,799,630 registered as Edward Richards (Jan. 24, 1989) and entitled "Landing Attachment to Aircraft for Amphibious Landings". This invention consists of two metal attachments each of which takes the shape of the boat and extends parallel to the entire length of the bottom surface of the belly of the plane, interspersed with a set of openings in the middle of which comes out a row of fixed and partially visible wheels. In terms of shape and size, the design priority for this invention is for emergency landings on water.

When looking at the graphics in this patent, it is clear how much of the excess burden these attachments will cause on the aircraft in terms of size and weight which will inevitably lead to increase fuel consumption, in addition to the remarkable impact on the flying efficiency due to the counter forces and air backwash during flying in relation to the structure of the attachments, which are designed to float on the surface of the water, and the rooms in which the wheels are located, as well as the wheels hanging and always visible. This invention will also often hinder the work of the doors responsible for the entry and exit of the main wheels located under the belly of many types of aircraft due to the extension of the attachment from the beginning of the belly of the plane to the end. Hence the importance of the present invention in being an alternative landing system that has a distinctive mechanism of action and designed efficiently so as not to cause any burden in terms of size, weight or space; and flexibility of target places selection as it is an independent covered system with high air aerodynamic.

U.S. Patent No. (US2018/0162514 A1) registered (Daniel Bellet & Guillaume Gallant) dated (Jun. 14, 2018) and entitled "Aircraft Comprising a Common Structure for Supporting a Power Plant and a Landing Gear Element". This invention consists of two attachments installed on the bottom of the two fuel tanks (wings of the plane). They serve as generators of electric power, from which the main power generator is fed, in addition to feeding the main landing system with the necessary power.

It is noted that this invention does not function as an alternative to the main landing system but only feeds it with energy. Furthermore, according to the inventor himself, the main rear wheel arms of the main landing system must be lengthened in order to have the appropriate space for the positioning of these two attachments, which will cause an increase in size and weight and affect the balance of the aircraft. The inventor mentioned that this invention is not suitable for all aircraft but only for that with an engine above in which a main engine can be placed above the fuel tank (wing) not under it. As a result, the purpose of this invention is to power the basic landing system and not to replace it, as opposed to the present invention, which constitutes an integrated alternative landing system.

Patent from the International Bureau No. (WO 2016/141447 A1) registered (Robinson, Eric Brian) dated (Sep. 15, 2016) and entitled "Aircraft Landing Gear and Methods". It is a new design for an amphibious aircraft with a basic landing system that allows the aircraft to land on both land and water.

In conclusion, by addressing the possibility of a malfunction in the basic landing systems and referring to some of the procedures currently used in the emergency landing, then comparing and going through ideas given in an attempt to find solutions by addressing the attachments that are directly and indirectly related to the landing systems, it is evident and clear that this field of aviation industry is in urgent need of alternative landing gear that is effective and practical, to ensure a safe emergency landing for the aircrafts.

GENERAL DESCRIPTION OF THE INVENTION

The present invention is related to auxiliary spare landing equipment attached to aircraft for use in the event of emergency landing. It includes separate systems located below the aircraft, specifically in the centers of gravity in which the aircraft rest on landing runway. Each spare landing system includes the following:

A—The aerodynamic cover, which is a cover with curved designs (Airfoil) for efficient air flow and to give the best ratio of lift and drag or stability through longitudinal and transverse driving during flight, and it is made of materials that are susceptible to shattering, fragmentation and scattering when hitting a solid object.

B—Wheel gear, includes struts (c), wheelbase (d), and tires (E) which are all fully covered and concealed by the aerodynamic cover (A).

C—Struts, solid links that connects the structure or the bridges of the aircraft and its engines to the wheelbase to carry weights with the possibility of adding shock absorbers.

D—Wheelbase, the tool that connects the struts to the tires through a high-bearing base connected to the discs (hubs) with the possibility of adding self-brakes.

E—Tires include one or two wheels or a group of wheels of various sizes and shapes, such as flexible tires filled with nitrogen to withstand the impact absorbing factors at the beginning of the landing process, or solid wheels that can bear high weights.

The method of installation of spare landing systems varies according to the locations targeted under the aircraft.

The first: it is possible to install a part of the spare landing system inside the fuselage. This is when the target location is determined and there is a space to allow the system to be installed inside, such as the belly of some aircraft.

Second: The spare landing system can be fully installed outside the fuselage when the appropriate area is identified and fully occupied as the bottom of the LD jet engine in some aircraft.

The modus operandi of the present invention in general: FIG. 5) shows a two-engine aircraft under the wings plus the present invention of the spare landing systems under the two engines as well as the bottom of the belly of the aircraft, noting that this aircraft is of the type that the level of the two engines is lower than the fuselage. When a complete or partial defect occurs to the basic wheel system of the aircraft, then the plane will head to the landing runway, as shown in FIG. 5-A). Then the plane lands as horizontally as possible then the present invention starts its mission. And when the surfaces of the spare wheel covers touch the runway floor, they automatically begin to crumble and scatter as shown in form (5-*b*) specifically the spare wheels system located under the jet engine, as shown in the enlarged section. Thereafter, the aircraft will successively land on all the spare wheel systems located under the airframe. Finally, the engines, flippers, and wheels, if self-brakes are added to them, gradually reduce the speed of the aircraft until it stops completely on the landing runway, as shown in FIG. 5-C).

Hence, the aim of the present invention is to provide a backup landing system for emergency situations when the main landing systems fail to function, whether the malfunction is complete or partial. It works to ensure a safe landing of the aircraft, which increases the confidence of the captain and the passengers that there are safety equipment under the aircraft capable of preserving them. In addition to preserving the fuselage with its engines, as well as not disrupting the landing strip. For example, the present invention does not require that slippery foam be placed on the runway surface, which necessitates waiting and disrupting the landing of intact aircraft until the runway is prepared. The additional features and other appendices of the present invention will be extensively covered in the subsequent detailed description accompanied by the illustrations. As well as protective elements.

BRIEF EXPLANATION OF THE ILLUSTRATIONS

In referring to the illustrations, below is a set of illustrations with a brief description as follows:

FIG. 1A A side view from a three-dimensional elevation angle with shadow added, showing the aerodynamic cover. It is a curved structure (Airfoil) that produces aerodynamic force during its movement through the air to give the best ratio of lift and drag during flight. This casing has the property of shattering and scattering when hitting a solid object.

FIG. (1B) A side view of a casing in accordance with another embodiment of the invention;

FIG. 2 A side view from an elevation angle showing the spare wheel gear: It is the wheelbase in which the tires with strong structure and small sizes are fixed and have a proportional relationship with the sizes of the basic wheels and the size of the aircraft.

FIG. 3 a side view from an elevation angle showing an aircraft with jet engines as it is in the airspace, with backup landing equipment added as follows:

A) A photograph of the aircraft, plus the spare landing system, as it appears, attached to the bottom of the aircraft and its engines and in separate areas.

B) An image of the aircraft with an enlarged explanatory clip for the reserve landing systems, showing the covers and inside them the wheel gear as it is attached under the belly of the aircraft and its engines.

C) An image of the aircraft with the spare landing system in addition to it, as shown below and in separate areas, side by side with the basic landing gears.

FIG. 4 A side view showing the runway and the front of the cylindrical shape of an aircraft to which a spare landing gear is added installed below in the landing operations scene, as follows:

A) The nose of the aircraft, which is in the air at the scene of the landing operation and near the runway, with an enlarged illustration for the reserve landing systems, showing the aerodynamic casing and inside it the wheel gear.

B) The nose of the aircraft which is in the air at the scene of the landing operation and the beginning of the contact of the cover to the runway with an enlarged clip for the reserve landing systems, showing the shattering of the casing when it comes into contact with the runway.

C) The nose of the aircraft as it lands on the runway in the scene of the handing operation and the beginning of the wheel contact with the runway with an enlarged illustration of the reserve landing systems, showing the scattering of cover particles and the appearance of wheel gear after contact with the runway.

FIG. 4-D a side view of an aircraft with ground engaging module in accordance with another embodiment of the invention.

FIG. 5 a front view showing the runway and an aircraft with jet engines with the spare landing gear in the landing operations scene, and it includes the following:

A) A front section of the aircraft while it is in the airspace, plus the spare landing systems, as it appears under the plane and its engines in the landing scene and near the runway.

B) A front section of the aircraft in which the wheel gear covered with aerodynamic covers is fixed as it appears under the belly of the aircraft and its engines with an enlarged illustrative section showing the scattering of the cover particles after being crushed and the appearance of the wheel gear below the engines at the moment of contact with the runway.

C) A front view of the aircraft resting on the auxiliary wheels after the landing operation has been completed with the spare landing gear.

DETAILED DESCRIPTION

In the following, the present invention will be explained in detail and for specific models of aircraft combined with illustrations. It is to be noted that these embodiments of the models are only an example and not limited to. It is merely an illustration, that is, it embodies a few of the many patterns and shapes that can be applied to the basic rules of invention. Hence, the various changes and modifications within the field to which this invention relates and which are apparent to the skilled person will fall under the scope and spirit of the invention as defined in the protection elements.

The present invention, in general, is an extension underneath the aircraft and is located at the anchor points where flying objects rest on the ground. Its aim is to provide a safe spare system that ensures these machines will safely land when the primary landing gear is malfunctioning. The present invention "Spare landing gear for aircrafts" contains two basic concepts:

The first concept: The covers are made of materials that are prone to shattering and scattering on the impact with the landing strip, which leads to it being snatched or peeled off and then disposed of without collateral damage. Airfoil casings are also designed to facilitate efficient airflow and to give the best ratio of lift, drag or stability, whether longitudinal or transversal in flight.

The second concept: The wheel gear that works to connect, support, and host the wheels, which are positioned between the aircraft and the runway floor. This equipment includes one or two wheels or a group of wheels according to the weight distributed and associated with the number of attachments of the aircraft. As for the sizes, they are, according to a proportional relationship, smaller than the basic aircraft wheels, and the reason is that they are prepared for single use from the principle of safety as is the case with airbags for cars. Also, considering the desired efficiency of reducing the area of prominence of the system when concealed by airfoil covers. The wheels are installed with bases whose shapes differ according to the number of wheels involved, and the base is connected directly to the chassis or to one or more pillars each, depending on the target location of the spare system. The length of the pillars and the extent of their need are approved after determining all the locations of the other systems below the aircraft and the reason is considering the distribution of weight and the desired extent of prominence in an appropriate manner on all spare wheel systems.

The task of the present invention is to avoid any catastrophe in the event of a failure with the conventional landing gear by providing additional backup landing systems that ensure that the aircraft lands safely on the ground through multiple fixed spare wheels and which ensure that there are always spare wheels under the aircraft and is in a state of alert to land in Emergency. This present invention contributes to the safe landing of the flying machine, thus preserving the passengers, the fuselage of the aircrafts with its attachments, and not disrupting the runway. For example, the present invention does not require that slippery foam be placed on the surface of the landing runway, which necessitates waiting either before landing due to the operations of bringing, pouring, and distributing the foam or because of the disruption of the landing strip until the damaged aircraft is dislodged as well as waiting and delaying or disrupting the landing of the other aircraft that waiting in the airspace until the foam is removed.

After a generic description, we dive into a more detailed description of the present invention. The spare systems are installed under the flying body based on determining the target anchor positions for each system, considering whether it is a complete system failure or partial malfunction. The goal is if only one landing gear stop working, such as the front core which is called the nose landing gear, then the aircraft lands on the traditional main landing gear located in the middle and then tilts the front of the plane down until it approaches the ground, so the spare system automatically starts the dynamic action designed for it. For example, and not as a limitation, as shown in FIG. 3-A), under the plane in front and behind, there are individual spare systems, and in the middle, there are three backup systems. Each of these spare systems is integrated and independent on its own as shown in FIG. 3-*b*). An enlarged section shows the front spare equipment connected to the airframe as well as a spare equipment attached to the bottom of the jet engine.

Referring to FIG. (1) the aerodynamic cover is called a casing, cover, crust, and surface as well as cladding, which is a structure with an aerodynamic body (Airfoil) to give the best percentage of lift, drag or stability by longitudinal driving as well as occasional driving in flight. The aircraft is designed in a way that ensure to get advantage of the air, both by assisting the thrust force of the lift and towing, to produce the lifting and towing force of the flight and landing process, and through the equilibrium of the most stable of the flying body at the level of longitudinal symmetry. From the principle of these forces, the ground engaging module [3] appear in FIG. (4-A), the aerodynamic envelope protruding from the fuselage and designed to take into account the dynamics and the opposite forces of the air in various flight conditions, especially its presence with not being used in most cases as long as the aircraft does not face problems in the landing process. That is, it lands normally on the main landing gear, so its role is most likely to remain on alert. The main purpose of the airfoil cover [4] is to cover and protect the wheel gear [5] as it is with ground engaging module [3] depending on the location of the gear and the number of wheels and size of the appropriate casing shape is designed for it. Therefore, these covers are characterized by the flexibility of the aerodynamic designs suitable for air flow, which maintains the efficiency of the flight and the expulsion of the fuel discharge. The shape of spare landing gear casing is similar to the shape of the flap track fairings in terms of the streamlined manner, which are located under the wings of most airplanes. Also, it is close to some types of equipment located on the upper surface of some aircraft that responsible for capturing signal frequencies such as the internet through satellites.

By going to the following FIGS. (4-B) and (4-C), it is clear that the airfoil covers [4] have the property of smashing, fragmenting into broken elements [6], and then scattering into small pieces [8] when they come into contact with a solid object the purpose of this property is autonomy in itself in all circumstances of the principle of dynamic work. When a malfunction in the basic landing gear occurs, the aircraft has to start preparing for the landing and once these covers touch the landing ground begins their mission that is to smash and scatter to allow the spare wheels [5] to be exposed. It is very close to the characteristic of vehicles glass, as this glass has the characteristic of fragmentation and scattering when impacting a solid object and specifically the glass of the side windows of the vehicles and its purpose is to protect and the safety of passengers inside while the purpose of these covers is to protect the aircraft and not to disable the landing ground. The feature of shattering and scattering is based on two ways to start this process.

The first method: the form of the traditional airfoil cover as it appears in FIG. (1) when touched or increased load pressure on it due to the impact of the landing floor begins the process of smashing.

The second method: to initiate the shattering process, specific designs can be added, such as a fin [11] as shown in FIG. 1B, which is placed at the front of the casing so that it assists in emphasizing the impact with the landing strip, to ensure smooth shattering process.

Referring to FIG. (2) the wheel gear system, it is a collection of relatively small tires of multiple sizes and high durability to carry different weights so that their size and number are determined by special measurement and simulation programs by specialists in this field according to performance efficiency. For example, but not a limitation, FIG. (2) shows four pairs of stone rubber wheels, while FIG. (4-C) wheel gear [5] portrays, flexible rubber tires filled with nitrogen gas and FIG. (5-c), only a pair of wheels appears for both the jet engines and also below the fuselage in the fore. It is possible to install solid wheels such as used in heavy transport equipment to withstand high weights.

Also, what distinguishes the wheel system is that it is self-independent in regard to the area of installation that means it can be installed at any suitable point of the aircraft, so that it can be placed completely outside the airframe and its attachments, or part of it can be placed inside the airframe and its attachments, and the goal is to reduce the visibility of the system as much as possible to maintain the efficiency of flight. For example, in the horizontal position of some aircraft, the area below the jet engine is the first part that touches the runway and it is known that the engine body is fully occupied to reach the highest possible efficiency, therefore if part of the wheel system cannot be placed inside the engine body when the wheel system is placed externally As in FIG. 3-b), the system appears below the jet engine and is directly attached to the wheelbase. On the other hand, there are sites with the airframe or its attachments where there is sufficient space to build part of the system inside, as shown in FIG. 4-C). The entire nasal wheelbase pillar is located inside the airframe and is connected to the body supports or what is called supplies due to the available space.

Referring to FIG. 3-A) which shows the entire system, and the potential installation of the areas of these systems. While installing the systems two principles should be taken into consideration, the total failure and partial failure of the basic landing gear systems of all aircraft and their different body shapes that possess basic equipment for landing. What distinguishes the present invention is its effectiveness to respond with the least risk, for example when the conventional nose landing system is unable to work, the aircraft lands on the main equipment in the middle and then tends forward until the nasal reserve system touches the landing ground and then starts its dynamic work. Likewise, when all the basic landing systems are malfunctioning, then the aircraft lands on the reserve landing systems, so that each system performs its work dynamically from the beginning of its contact with the landing ground until the aircraft stops safely.

Among the characteristics of the backup systems is the shock absorption feature to reduce the shock of the aircraft colliding with the aircraft and its attachments on the landing strip floor in order to reduce the target area as much as possible wheel gear [5] can be configured with shock absorbers can be placed through the struts attached to the wheelbase, whether pneumatic or oil. As well as through the wheelbase with wheels by cranks that connect the airframe or its attachments to the wheelbase. Also, here the support can be increased through the spare wheel system struts in addition to the wheelbase cranks to double the expected effort bearing. The struts can be dispensed with and can be found directly on the wheelbase with the tires. The tires can also be self-absorbing shock absorbers, and so on, depending on their location to withstand the impact. For example, forklifts often have high endurance tires regarding heavy weights.

By going to FIG. (5-C) the wheels, the figure shows the completion of the process of stopping in the range of the landing strip, and to reinforce this, self-brakes can be placed on the wheels. It is an independent automatic braking system, whether by brake shoe drum brakes or brakes that act by air pressure, or by ceramic or conventional discs with friction lining or mechanical brakes. Its purpose is to contribute to the dynamic process of the backup system, which includes automatically reducing the speed of the aircraft along with the engines, flaps and ailerons located on the edges of the wings after the aircraft is docked on the landing floor, which helps the aircraft to park as soon as possible.

Referring to FIG. (C-3), the additional emergency landing reserve equipment is shown alongside the conventional basic landing gear. Accordingly, the measurements were not addressed in values such as centimeters and inches, nor with the correct numbers specified for the system of the present invention, whether the measurements were in length, width, or height, due to the vastness of the available space and the freedom of the unoccupied range between those objects and their attachments and the runway. And also because of the abundant configuration of the various airframes and their accessories.

A step-by-step method for the work of the present invention, with reference to FIG. (4-a), as the projection on the plane of the forward cylindrical spindle element [2] appears. This aircraft includes the attachments of the present invention and the focus will be on the ground engaging module [3], which is the auxiliary landing gear apparent in the enlarged section, which includes the streamlined cover [4] and the wheel gear [5]. And from it, when the plane is in the air and when approaching the destination, the captain begins to take the necessary procedures for the landing. Assuming an emergency situation occurs, the primary landing gear systems are not responding, and that a malfunction is preventing them from getting out. Upon permission, the captain informs the control tower of the accidental incident, in order for the airport team to take the necessary safety measures, and then take approval for landing. Then the plane approaches the runway [1] and it is preferable to try to land as smoothly as possible to reduce the phenomenon of hitting the runway floor. When the nose spare landing gear touches the runway floor as shown in FIG. (4-b), the airfoil cover [4] begins to shatter into broken elements [6]. Then, by going to FIG. (4-c), successively, after the smash, the casing begins to crumble and scatter into small pieces [8] and gradually the spare wheels [5] appear and these wheels land on the landing floor at which the plane begins to reduce its speed until it stops completely.

The invention claimed is:

1. An aircraft having a body including fuselage, wings and at least one engine, the aircraft comprising:
- a retractable landing gear including a set of landing wheels and being configured to be shifted between a retractable position, in which said landing wheels are retracted with respect to a bottom portion the body, and an extended position, in which said landing wheels are extended with respect to the bottom portion at a first distance;
- an emergency landing system including at least one ground engaging module having a set of emergency wheels and a cover member having an airfoil shape; said at least one ground engaging module protrudes from the bottom portion at a second distance;
- wherein said first distance is larger than said second distance, such that when said retractable landing gear is at said extended position, during landing of the aircraft on a ground, said landing wheels engage the ground, and when said retractable landing gear is at said retracted position, during landing of the aircraft, said ground engaging module engages the ground;
- wherein said cover member is made of material configured to be shattered when engaging the ground during landing, exposing thereby said emergency wheels.

2. The aircraft of claim 1 wherein said emergency landing system includes a plurality of ground engaging modules protruding from a plurality of location of the bottom portion.

3. The aircraft of claim 2 wherein said plurality of ground engaging modules includes at least one of ground engaging module located at the bottom portion of the fuselage and at least one ground engaging module located at the bottom portion of the engine.

4. The aircraft of claim 1 wherein said ground engaging module is mounted inside said body such that only said cover member protrudes from said bottom portion.

5. The aircraft of claim 1 wherein said ground engaging module is mounted outside said body such that the entire ground engaging module protrudes from said bottom portion.

6. The aircraft of claim 1 wherein ground engaging module further includes a fin disposed at the below of the cover configured to facilitate the shattering of the case when engaging the ground during landing.

\* \* \* \* \*